US008615346B2

(12) United States Patent
Monig et al.

(10) Patent No.: US 8,615,346 B2
(45) Date of Patent: Dec. 24, 2013

(54) METHOD AND DEVICE FOR CONTROLLING A BLOCKING MEMBER

(75) Inventors: Stefan Monig, Schwelm (DE); Dirk Wittwer, Heiligenhaus (DE); Armin Geurden, Grefrath (DE); Jorg Simon, Wulfrath (DE); Mirko Schindler, Velbert (DE); Matthias Klein, Dachau (DE); Joachim Schneider, Velbert (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 313 days.

(21) Appl. No.: 12/921,989

(22) PCT Filed: Mar. 5, 2009

(86) PCT No.: PCT/EP2009/052628
§ 371 (c)(1),
(2), (4) Date: Sep. 10, 2010

(87) PCT Pub. No.: WO2009/112429
PCT Pub. Date: Sep. 17, 2009

(65) Prior Publication Data
US 2011/0190983 A1 Aug. 4, 2011

(30) Foreign Application Priority Data
Mar. 10, 2008 (DE) .......................... 10 2008 013 487

(51) Int. Cl.
*B62D 7/00* (2006.01)
*B60R 25/00* (2013.01)
*B60R 25/02* (2013.01)
(52) U.S. Cl.
USPC ................ 701/41; 701/36; 307/10.2; 70/252
(58) Field of Classification Search
USPC ........... 307/10.2; 70/252, 237, 277, 287, 280; 701/41, 36, 49
See application file for complete search history.

(56) References Cited

U.S. PATENT DOCUMENTS 6,516,640 B2 * 2/2003 Jacobs et al. .................... 70/252
7,140,213 B2 * 11/2006 Feucht et al. ................... 70/252
(Continued)

FOREIGN PATENT DOCUMENTS

DE 19809295 5/1999
DE 19929435 1/2001
(Continued)

OTHER PUBLICATIONS

English translation of DE 19809295.*
(Continued)

*Primary Examiner* — Thomas Tarcza
*Assistant Examiner* — Kevin Myhre
(74) *Attorney, Agent, or Firm* — Cantor Colburn LLP

(57) ABSTRACT

The invention relates to a method for controlling a blocking member (11) of a functional component (30), particularly of a steering column (30) of a motor vehicle, particularly of a motorcycle, having a drive (20) by which the blocking member (11) can be moved into a locking position (1) and into an unlocking position (2) and vice versa, wherein the blocking member (11) engages mechanically with the functional component (30) when in the locking position (1), releases from the functional component (30) when in the unlocking position (2), and the locking process is started via a defined triggering action on the part of the operator, the blocking member (11) being moved from the unlocking position (2) into the locking position (1) during said locking process. According to the invention, a controller (40) monitors the process, enabling a malfunction of the component (30), in which a locking position (1) of the blocking member (11) is impossible, to be detected, such that the blocking member (11) takes up the original unlocking position (2) despite the triggering action.

13 Claims, 3 Drawing Sheets

(56) References Cited

U.S. PATENT DOCUMENTS

| | | |
|---|---|---|
| 2005/0132765 A1 | 6/2005 | Nagae et al. |
| 2006/0144184 A1 | 7/2006 | Farmer et al. |
| 2006/0220457 A1 | 10/2006 | Yabumoto |

FOREIGN PATENT DOCUMENTS

| | | |
|---|---|---|
| DE | 10129095 | 3/2003 |
| DE | 102004045760 | 4/2006 |
| DE | 102004053438 | 5/2006 |
| EP | 1892506 | 2/2008 |
| JP | 2003097107 A | 4/2003 |
| JP | 2005185015 A | 7/2005 |

OTHER PUBLICATIONS

International Search Report; PCT/EP2009/052628; Jul. 2, 2009.
Japanese Office Action dated Sep. 24, 2013 re: Japanese Application No. 2010-550144.

* cited by examiner

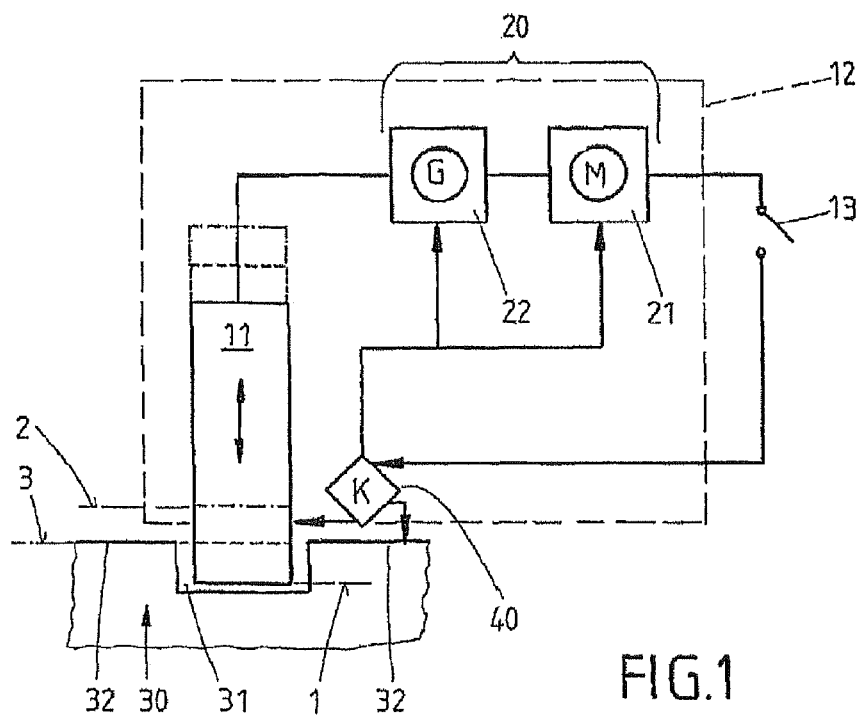
FIG.1
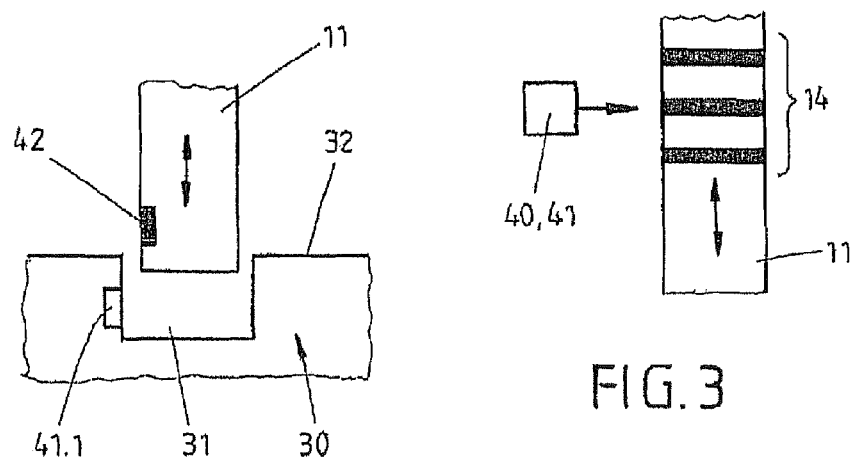
FIG.2
FIG.3

METHOD AND DEVICE FOR CONTROLLING A BLOCKING MEMBER

TECHNICAL FIELD

The invention relates to a method that is intended for actuating a blocking member of a functionally essential component, in particular a steering column of a motor vehicle, in particular a motorcycle, and that comprises a drive, with which the blocking member can be moved into a locking position and into an unlocking position and vice versa, wherein in the locking position the blocking member mechanically engages with the functionally essential component, and wherein in the unlocking position the blocking member is released from the functionally essential component, and wherein the user initiates a defined triggering action to start the locking process, during which the blocking member is moved into the locking position from the unlocking position.

BACKGROUND

The prior art discloses devices for actuating a blocking member, in particular a steering column of a motor vehicle. In this case there is a blocking member that can be moved into a locking position and into an unlocking position and vice versa by means of a drive. Such devices are used, for example, in the framework of electromechanical steering wheel locks, where the blocking member in the unlocking position is located largely inside the device and does not engage with the steering column. In contrast, the blocking member in the locking position projects beyond the device and is operatively connected to the steering column, which is, thus, held in a locking manner in its position. It has proven to be disadvantageous that, for example, the steering column can be put into an incorrect position, in which the blocking member unintentionally locks the steering column, because, for example, upon emerging from the device the blocking member abuts on a tooth of the steering column. If the steering wheel lock of the motorcycle is in such a state, in which the blocking member has left its unlocking position, but the locking position has not been reached because the steering column is in an incorrect position, then the user can still move the motorcycle. At the same time, however, the movement of the motorcycle may cause in a disadvantageous manner the blocking member to snap subsequently into the steering column. This unintentional subsequent latching of the blocking member can then lead to a crash of both the user and the motorcycle.

BRIEF SUMMARY

The invention provides a method and a device for actuating a blocking member of the aforementioned genre, wherein the said drawbacks are avoided. In particular, the invention provides a method and a device that improves the safety of the user.

To this end the invention provides that monitoring occurs by means of a control unit, which can detect a possible incorrect position of the component that rules out a locking position of the blocking member, so that despite the triggering action the blocking member subsequently occupies the original unlocking position. The component may be an element of a motor vehicle, motorcycle or a quad bike. The invention prevents the occurrence of more than two positions of the blocking member over a prolonged period of time. If the locking process is started by the triggering action, it may happen in some cases that the component does not occupy the exact position for a locking position of the blocking member. In this case there is no mechanical engagement of the blocking member with the functionally essential component. The component may be configured, for example, as a steering column that has recesses, with which the blocking member in its locking position engages. In one such possible incorrect position of the steering column the blocking member does not move into the said recess after the triggering action, but rather makes contact, for example, with the adjacent region (tooth, etc.) of the recess. This undesired floating state of the blocking member is detected by the control unit, which once again actuates the blocking member for the purpose of moving it into its original unlocking position. In this way it is possible to effectively inhibit the blocking member from locking unintentionally and involuntarily from an intermediate position. It is possible for the steering column to be in an incorrect position when, for example, the handlebar of the motorcycle is not in its corresponding position. The conscious action to trigger the locking process can take place, for example, by depressing a button or by removing a key from the electromechanical steering lock.

A possible incorrect position of the component can be checked, for example, directly by means of the position of the blocking member. During the locking process the control unit can check the extent to which the blocking member occupies a defined extended position, in which the locking position is reached. When the locking position of the blocking member has been reached, the conclusion may be drawn that the component is not in an incorrect position.

As an alternative, it is, of course, conceivable to determine the position of the component, in particular, the steering column, directly by means of the control unit. Similarly one possibility is that during the locking process the control unit detects or determines a state variable of the drive, from which a possible incorrect position of the component can be found. If, for example, the drive has an electric motor and a transmission, which is in a mechanical functional contact with the blocking member, then the position of one of the transmission elements, in particular, the drive wheel or the output wheel, which serves as the state variable, can be used to deduce that the functionally essential component is in a possible incorrect position.

In an additional possible embodiment of the invention, the control unit is actuated and activated by means of the triggering action. This means that the position of the functionally essential component is not checked until after the conscious action on the part of the user for the purpose of locking the motor vehicle. As an alternative and/or in addition, it is naturally conceivable in an additional embodiment of the invention that a permanent monitoring of a possible incorrect position of the component is carried out.

The method according to the invention comprises the option of moving the blocking member back into the unlocking position from an intermediate position, which lies between the unlocking position and the locking position, after detecting that the component is in an incorrect position. This embodiment provides in parallel after the triggering action on the part of the user a corresponding movement of the blocking member from the unlocking position into the locking position as well as a corresponding monitoring by the control unit to the extent that the component is or is not in an incorrect position. If unfortunately the conditions for an incorrect position are met, then the blocking member is moved from an intermediate position back into the unlocking position. Another possible design variant can provide that following detection of an incorrect position of the component the blocking member remains immoveable in its unlocking position despite a triggering action on the part of the user. In this case a possible incorrect position is determined by means of the direct position finding of the functionally essential component. Not until there is positive feedback that the functionally essential component has the correct position for a locking position of the blocking member does an actuation occur in order to move the blocking member from its unlocking position into the locking position. If there is no positive feedback, then the blocking member remains immoveable in its unlocking position.

The control unit has advantageously a sensor element, which generates a sensor signal, in particular, by means of a defined change in the electrical property of the sensor element. This sensor signal can be used to determine that the component is in a possible incorrect position. For this purpose it is possible to use a variety of sensors—in particular, analog, binary or digital sensors. In one advantageous design variant the said sensor signal is generated by means of a change in the inductance, the resistance or the capacitance. For example, the sensor element can be designed as a magnetic field sensor, a pressure sensor or as an optical sensor.

There is preferably a housing that contains the drive, the blocking member and the control unit. As an alternative, the control unit may also be disposed outside the housing, in particular in the vicinity of the functionally essential component, in order to monitor its position. The functionally essential component is connected to a handlebar element that can be moved advantageously into a left and a right stop position by the user. As a result, a locking position of the blocking member can be reached only in the said stop positions. If the handlebar element is not in one of the said stop positions, then the functionally essential component is, according to the invention, in an incorrect position. The blocking member cannot reach the locking position by way of the defined triggering action, because the control unit detects this incorrect position. The functionally essential component—in particular, the steering column of the motorcycle or the quad bike—has advantageously only two receptacles, with which the blocking member in its locking position can engage in a locking manner.

The device according to the invention can be used as the electric or electromechanical steering lock. In addition, the device can be combined especially with so-called "keyless entry systems." The device according to the invention can be activated, for example, by radio signals or after a data exchange has taken place. In this respect the invention enables as a matter of fact a feedback as to whether the respective device is or is not blocking reliably the functionally essential component, in particular, the steering column. This state can be shown, for example, by means of an optical or acoustical message device in the motor vehicle.

BRIEF DESCRIPTION OF THE DRAWINGS

Other advantages, features and details of the invention are apparent from the following description, in which a number of embodiments of the invention are described in detail with reference to the drawings. In this respect the features that are mentioned in the claims may be essential to the invention individually or in any combination.

FIG. 1 is only a schematic drawing of the inventive device for actuating a blocking member, FIG. 2 shows a potential embodiment of the control unit for monitoring a possible incorrect position of the steering column, FIG. 3 shows an additional embodiment of the control unit that is configured as an optical sensor.

DETAILED DESCRIPTION

Figure 4:
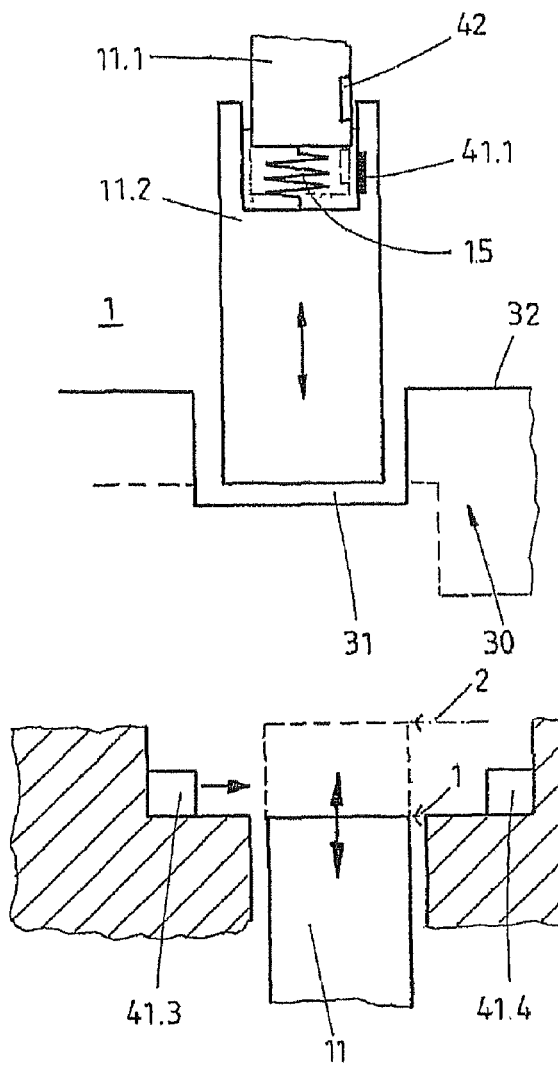
FIG. 4 shows an alternative of the control unit that is mounted on a two-part blocking member.

FIG. 1 is only a schematic drawing of a possible embodiment of a device 10 for actuating a blocking member 11 of a functionally essential component 30. The component 30 involves a steering column 30 of a motorcycle. The device has a drive 20 comprising a transmission 22 and an electric motor 21. The transmission 22 is mechanically coupled with the blocking member 11. In this case FIG. 1 shows the blocking member 11 in a locking position 1. The transmission 22 moves the blocking member 11 in a translatory manner out of the locking position 1 upwards into an unlocking position 2, which is symbolized by the dash-dotted line in FIG. 1. In the locking position 1 the blocking member 11 projects with its free end into a groove 31 of the steering column 30, thus locking the steering column 30. In contrast, the blocking member 11 in the unlocking position 2 is released from the steering column 30.

In the present embodiment the blocking member 11 is made of a metal—in particular, steel. In this case the material thickness is dimensioned in such a way that destruction of the material can be largely ruled out. In an alternative embodiment the blocking member 11 can be made by means of the injection molding technology. In the present embodiment the free end of the blocking member 11 is rounded off in its contour, thus making it easier for the blocking member 11 to snap into the groove 31 of the steering column 30. In another embodiment (not illustrated) the free end of the blocking member can also be configured so as to be chamfered.

The transmission 22 can be configured, for example, so as to be multi-stepped, a feature that is not explicitly shown. In this case the transmission 22 can have a drive wheel that acts directly on the blocking member 11. For example, the drive wheel can be driven by a worm shaft that is driven by the electric motor 21.

Furthermore, the device 10 has a housing 12, which contains the drive 20, the blocking member 11 and a control unit 40. In this context the control unit 40 serves to monitor the position of the steering column 30. That is, the locking position 1 of the blocking member 11 can be achieved only if the steering column 30 and its groove 31 occupy the correct position in relation to the blocking member 11. If the groove 31 does not exhibit its respective position that is necessary for the locking position 1 of the blocking member 11, then after a defined triggering action on the part of the user, the blocking member 11 moves from the unlocking position 2, in which the blocking member 11 is released in relation to the steering column 30, against the tooth 32 or the flank of the steering column 30, where the blocking member 11 occupies an intermediate position 3 that lies between the unlocking position 2 and the locking position 1. In this instance the blocking member 11 occupies an intermediate position 3 that is between the unlocking position 2 and the locking position 1. The blocking member 11 moves back from the intermediate position 3 into the unlocking position 2 by way of the incorrect position of the steering column 30 that is detected by the control unit 40.

The user consciously initiates the triggering action by means of a switch 13. The result is that the blocking member 11 is moved in a translatory manner from its unlocking position 2 into the locking position 1 by means of a drive 20. The control unit 40 can determine in a number of ways a possible incorrect position of the steering column 30 that is indicated in a schematic manner in FIG. 1. For example, the control unit 40 can check via the extended position of the blocking member 11 during the locking process whether a locking position 1 has been reached. In the event that the blocking member 11 has left the unlocking position 2, but has not reached the locking position 1, but rather is, for example, in the intermediate position 3, then it may be concluded that the steering column 30 is in an incorrect position.

In an alternative embodiment the control unit 40 can also determine directly the position of the steering column 30, in order to detect in this way a possible incorrect position. Similarly it is conceivable that the determined state variables of the drive 20 can be used to draw conclusions about a possible incorrect position of the steering column 30, which is also indicated in FIG. 1. For example, the current of the electric motor 21 can serve as the state variable that is determined by the control unit 40. Another potential embodiment of the device according to the invention provides that an increase in current in the electric motor 21 can be used to draw the conclusion that the blocking member 11 is resting against the tooth 32 of the steering column 30 and is, thus, in an intermediate position 3.

The control unit 40 can be designed with a sensor element 41. According to FIG. 2, the sensor element is configured as a Hall sensor 41.1 that is mounted directly on the steering column 30 in the area of the groove 31. The free end of the blocking member 11 has a permanent magnet 42. When the blocking member 11 is in the locking position 1—thus, is inside the groove 31—then the Hall sensor 41.1 detects the position of the permanent magnet 42 inside the groove 31. In an additional alternative (not illustrated) the Hall sensor and the permanent magnet can be mounted in other places, in particular, on the housing of the device according to the invention, in order to determine every position of the blocking member 11. The range of magnetic field sensors also includes reed switches, magnetic resonance sensors or the like that operate without making contact and are, thus, wear resistant.

FIG. 3 shows another design alternative of the control unit 40 that is configured as an optical sensor 40. The blocking member 11 has position marks 14 that the optical sensor 40 detects without making contact. In this way every position 1, 2 of the blocking member 11 can be detected. The present embodiment has a series of position marks that include a plurality of alternating stripes arranged one after the other in the longitudinal direction of the blocking member 11. In this position pattern 14 each position of the blocking member 11 is coded so that by scanning the position mark 14 by means of the optical sensor 40 the current position of the blocking member 11 can be determined. In the present case the sensor 40 is configured as a light reflection sensor that has a transmitter that emits transmitting light beams, a receiver that receives receiving light beams and an evaluating unit that is not illustrated. In this case the transmitter preferably comprises a light emitting diode, and the receiver is composed of a photo diode. The evaluating unit comprises a microprocessor or the like. The light reflection sensor is integrated preferably in a housing that is small in size. In order to produce the dark position mark 14 recesses can be produced in the blocking member 11 at, for example, the positions intended for said position marks. These recesses open on the surface of the blocking member. These recesses have a negligible depth and are produced by suitable material removal methods, such as erosion. Layers of dark material are introduced into these recesses. These layers of dark material form the dark position marks 14 that can be produced, for example, by electrolytic oxidation. The dark material layers of the position marks 14 reflect, as compared to the surface of the blocking member 11, only a small portion of the transmitting light beams. The light sensor 40 can be mounted, for example, on the housing 12 of the device 10 according to the invention. As an alternative, it is also conceivable that the light sensor 40 is mounted on the steering column 30 and faces the blocking member 11.

In an additional design alternative it is conceivable that the blocking member 11 is configured as two parts. In this case the blocking member 11 includes, inter alia, a base part 11.1 and an active part 11.2, both of which are connected together by a spring element 15. FIG. 4 represents the normal case, in which the blocking member 11 moves in an operatively correct manner into the locking position 1. In this case the free end of the active part 11.2 is inside the groove 31 of the steering column 30. In the event that the steering column 30 is in an incorrect position, the free end of the active part 11.2 hits the tooth 32. During this process the drive 20 continues to move the base part 11.1 in the direction of the active part 11.2. The base part occupies the position that is shown by the dashed line in FIG. 4. At the same time the spring element 15 is compressed even more. In this embodiment according to FIG. 4 the control unit 40 is configured, as in FIG. 2, as a magnetic field sensor comprising a Hall sensor 41.1 and a permanent magnet 42. In this case the permanent magnet 42 is on the base part 11.1, and the Hall sensor 41.1 is on the active part 11.2. If the blocking member 11 strikes the tooth 32 when the steering column 30 is in an incorrect position, then the Hall sensor 41.1 is almost opposite the permanent magnet 42, as a result of which a signal is emitted. With this signal it is possible to detect that a locking position 1 of the blocking member 11 is not executable.

Figure 5A:
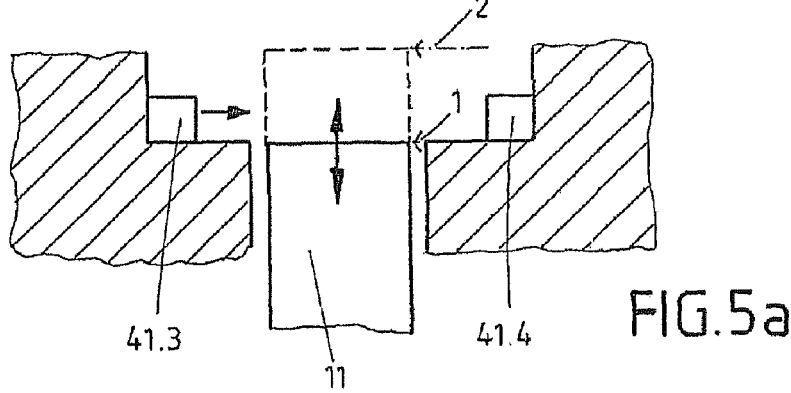
FIG. 5a shows another possibility of an embodiment of the control unit.
Figure 5B:
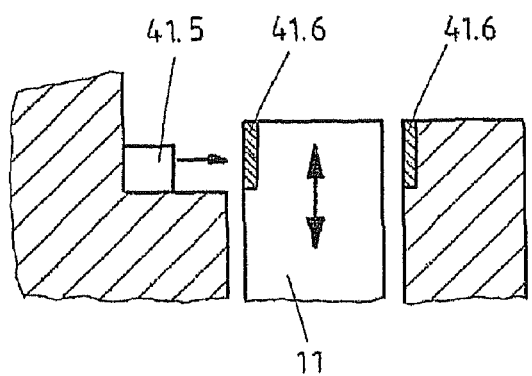
FIG. 5b shows yet another design alternative of the control unit on the blocking member.

In FIG. 5a and FIG. 5b the control unit 40 is designed with an optical sensor. FIG. 5a shows a control unit that works like a one-way light barrier that includes a spatially separated transmitting and receiving element 41.3, 41.4. In this case the interruption of the light beam between the transmitter 41.3 and the receiver 41.4 is sensed. In this context the sensor field can be operated with visible light or with infrared.

In FIG. 5b the control unit 40 is designed as a reflection light barrier that comprises a transmitting and receiving element 41.5—both of which are housed in a common housing. With the approach of the blocking member 11, the pulsed light or infrared radiation emitted by the transmitting and receiving element 41.5 is reflected at the reflector 41.6 that is also mounted on the blocking member 11 and is received via the receiving element 41.5. As an alternative the reflector 41.6 can be disposed inside the groove 31 of the steering column 30 that is also shown in FIG. 5b. In this case the blocking member 11 is mounted in a linearly moveable manner between the reflector 41.6 and the transmitting and receiving element 41.5.

In another alternative (not illustrated) of the invention the control unit 40 can have a sensor element that works like a pressure sensor. In this case it is possible to use strain gauge strips that are fastened, for example, on the free end of the blocking member 11 and can detect forces, torques, pressure, expansion or compression of the blocking member 11. The various design alternatives of sensor elements can be provided, of course, at the drive 20, in particular the transmission 22, the motor 21 and/or the housing 12, in order to determine the state variables, from which directly or indirectly an incorrect position of the steering column 30 can be concluded.

Figure 6:
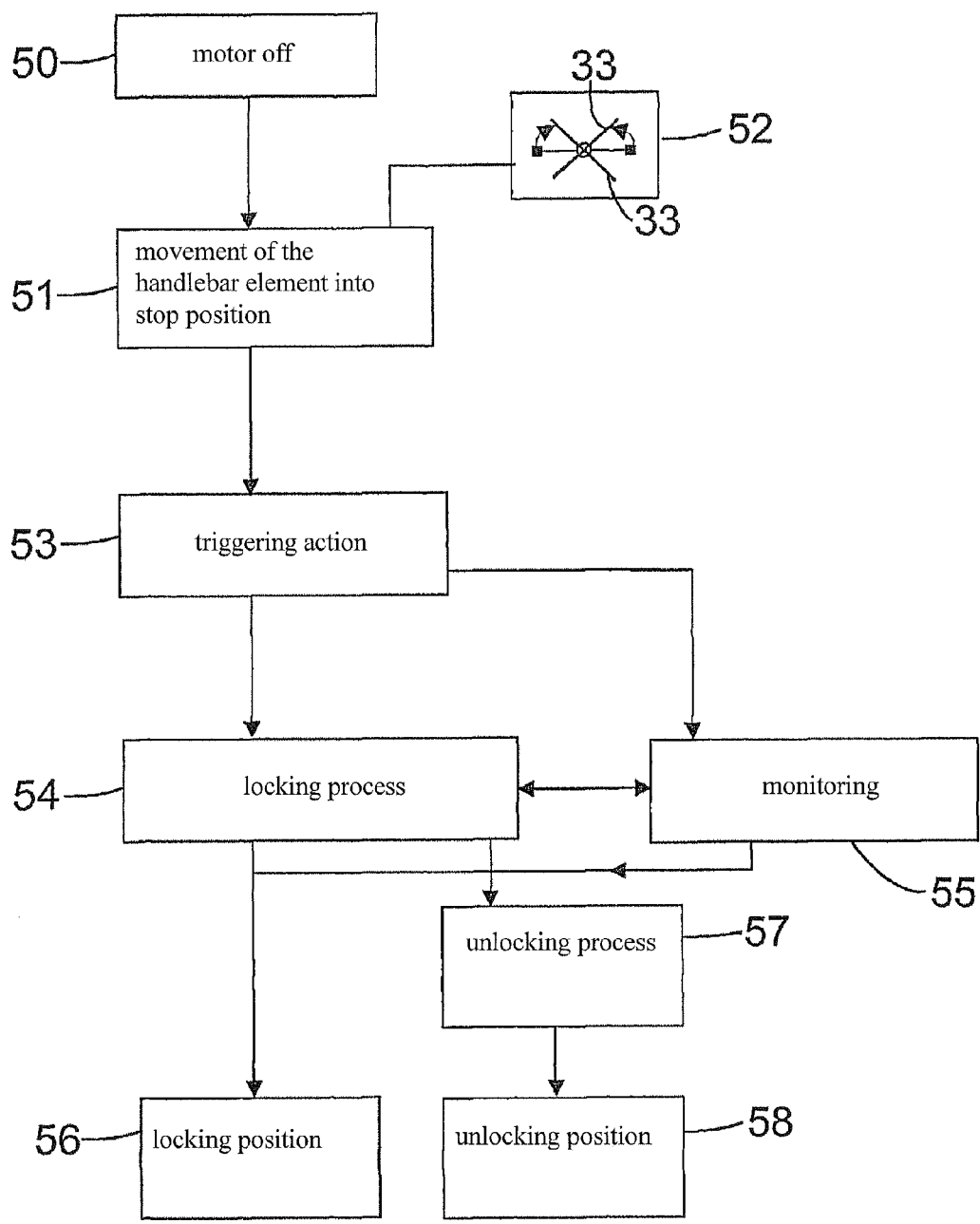
FIG. 6 is a schematic drawing of the inventive method for actuating the blocking member.

FIG. 6 shows one example of the inventive method for actuating a blocking member 11 of the steering column 30 of a motorcycle. After the user has switched off the motor by means of a conscious action in accordance with step 50, it is then necessary to execute another intentional movement of the handlebar element 33 into one of its two stop positions, which is shown in step 51. Step 52 shows as a schematic drawing that the handlebar element 33 of the motorcycle has a left and a right stop position. Only if the handlebar element 33 has reached one of the two stop positions is a locking position 1 of the blocking member 11 possible in accordance with FIG. 1. After the user has moved the handlebar element 33 into one of the two stop positions, there is an additional and intentional triggering action 53, with which the user consciously starts the locking process, during which the blocking member 11 can be moved out of its unlocking position 2 into the locking position 1. This triggering action 53 can be initiated, for example, with a switch 13 on the handlebar element 33. In parallel to the movement of the blocking member 11 into the locking position 1, the control unit 40 from FIG. 1 responds. This control unit starts a monitoring process 55 that checks for a possible incorrect position of the steering column 30. If the steering column 30 is not in an incorrect position, then the blocking member 11 moves into the locking position 56. If, in contrast, the steering column 30 is in an incorrect position, then the blocking member 11 moves back from a possible intermediate position into the original unlocking position 2.

Naturally it is conceivable that the control unit 40 contains information that the user in step 50 has switched off the motor by the user and/or whether one of the stop positions of the handlebar element 33 according to 51, 52 has been reached. In the event that one of the conditions according to 50, 51, 52 has not been satisfied, then the control unit 40 can block the triggering action 53, so that despite the conscious triggering action on the part of the user there is no locking process. This means that the blocking member 11 remains immobilized in its unlocking position 2.

The invention claimed is:

1. A method for actuating a blocking member of a functionally essential component that comprises a drive, with which the blocking member can be moved into a locking position and into an unlocking position and vice versa, wherein
   in the locking position the blocking member mechanically engages with the functionally essential component,
   in the unlocking position the blocking member is released from the functionally essential component,
   the user initiates a defined triggering action to start the locking process, during which the blocking member is moved into the locking position from the unlocking position,
   wherein a monitoring occurs by means of a control unit, which can detect a possible incorrect position of the component that rules out a locking position of the blocking member, so that despite the triggering action the blocking member subsequently occupies the original unlocking position,
   wherein after detecting that the component is in an incorrect position, the blocking member is moved back into the unlocking position from an intermediate position, which lies between the unlocking position and the locking position, or
   wherein following detection of an incorrect position of the component the blocking member remains immoveable in its unlocking position despite a triggering action on the part of the user, and
   wherein the control unit is actuated and activated by means of the triggering action.

2. The method, as claimed in claim 1, wherein during the locking process the control unit checks the extent to which the blocking member occupies a defined extended position, in which the locking position is reached.

3. The method, as claimed in claim 1, wherein during the locking process the control unit determines a state variable of the drive, from which a possible incorrect position of the component can be determined.

4. The method, as claimed in claim 1, wherein the drive has an electric motor and a transmission, which is in mechanical functional contact with the blocking member, whereby in particular the position of one of the transmission elements is determined as the state variable.

5. The method, as claimed in claim 4, wherein the current of the electric motor is determined as the state variable.

6. The method, as claimed in claim 1, wherein the control unit has a sensor element, which generates a sensor signal, in particular, by means of a defined change in the electrical property, in particular the inductance, the resistance or the capacitance, and said sensor signal can be used to determine a possible incorrect position of the component.

7. The method, as claimed in claim 1, wherein the sensor element is a magnetic field sensor, a pressure sensor or an optical sensor.

8. A device for actuating a blocking member of a functionally essential component that comprises a drive, with which the blocking member can be moved into a locking position and into an unlocking position and vice versa, wherein
   in the locking position the blocking member mechanically engages with the functionally essential component,
   in the unlocking position the blocking member is released from the functionally essential component,
   the user initiates a defined triggering action to start the locking process, during which the blocking member is moved into the locking position from the unlocking position,
   wherein a control unit, which can detect a possible incorrect position of the component that rules out a locking position of the blocking member, so that despite the triggering action the blocking member subsequently occupies the original unlocking position,
   wherein after detecting that the component is in an incorrect position, the blocking member is moved back into the unlocking position from an intermediate position, which lies between the unlocking position and the locking position, or
   wherein following detection of an incorrect position of the component the blocking member remains immoveable in its unlocking position despite a triggering action on the part of the user, and
   wherein the control unit is actuated and activated by means of the triggering action.

9. The device, as claimed in claim 8, further comprising a housing that contains the drive, the blocking member and the control unit.

10. The device, as claimed in claim 8, wherein the actuation of a provided switch or a push button can initiate the triggering action.

11. The device, as claimed in claim 8, wherein in the locking position the blocking member projects with its free end into a receptacle of the component, whereby in particular the component has only two receptacles.

12. The device, as claimed in claim 8, wherein the component is connected to a handlebar element, which can be moved into a left and a right stop position by the user, whereby only in the said stop positions can the blocking member reach a locking position.

13. The device, as claimed in claim 8, wherein a monitoring occurs by means of the control unit.

\* \* \* \* \*